United States Patent
Salcido et al.

(10) Patent No.: US 7,313,372 B2
(45) Date of Patent: Dec. 25, 2007

(54) STABLE PROCESS INDUCED CORRECTION BIAS CIRCUITRY FOR RECEIVERS ON SINGLE-ENDED APPLICATIONS

(75) Inventors: Manuel Salcido, Fort Collins, CO (US); Gilbert Yoh, Fort Collins, CO (US); Guy Humphrey, Fort Collins, CO (US); Salvador Salcido, Philonnath, OR (US)

(73) Assignee: Avago Technologies General IP Pte Ltd, Singapore (SG)

( * ) Notice: Subject to any disclaimer, the term of this patent is extended or adjusted under 35 U.S.C. 154(b) by 753 days.

(21) Appl. No.: 10/902,559

(22) Filed: Jul. 29, 2004

(65) Prior Publication Data

US 2006/0025089 A1   Feb. 2, 2006

(51) Int. Cl.
*H04B 1/04* (2006.01)
*H04Q 11/12* (2006.01)

(52) U.S. Cl. .............. 455/127.1; 455/127.3; 455/137; 330/10; 330/51; 330/133

(58) Field of Classification Search ........ 455/127.1, 455/127.2, 127.3, 280, 334, 341, 67.13, 115.1, 455/137; 330/10, 51, 173, 286, 302, 310
See application file for complete search history.

(56) References Cited

U.S. PATENT DOCUMENTS

| | | | |
|---|---|---|---|
| 4,775,807 A | 10/1988 | Bukowski et al. | |
| 5,689,814 A * | 11/1997 | Hagisawa et al. | ............ 455/69 |
| 6,070,211 A | 5/2000 | Neal et al. | |
| 6,137,849 A | 10/2000 | Humphrey | |
| 6,218,904 B1 * | 4/2001 | Panther | ...................... 330/296 |
| 6,400,771 B1 | 6/2002 | Humphrey | |
| 6,462,589 B2 | 10/2002 | Taylor | |
| 6,639,461 B1 * | 10/2003 | Tam et al. | .................... 330/10 |
| 7,113,744 B1 * | 9/2006 | Moloudi et al. | ............. 455/20 |
| 7,233,772 B1 * | 6/2007 | Darabi et al. | ................. 455/20 |

* cited by examiner

*Primary Examiner*—Tony T. Nguyen

(57) ABSTRACT

A second single-ended receiver having a first stage for receiving an input signal and outputting a pair of corresponding output signals, and a second stage for receiving the pair of output signals and outputting a corresponding single output signal. First and second pull-down transistors are coupled to first and second inputs to the first stage. A bias circuit electrically biases the first stage, second stage, and first and second pull-down transistors, and a power supply provides power to those components.

20 Claims, 2 Drawing Sheets

STABLE PROCESS INDUCED CORRECTION BIAS CIRCUITRY FOR RECEIVERS ON SINGLE-ENDED APPLICATIONS

BACKGROUND OF THE INVENTION

Prior solutions for implementing single-ended receivers were not required to operate at higher frequencies. At slower frequencies (125 MHz) the variation between rise and fall times contains more margin, and effects from simultaneous switching output (SSO) noise used up less of the relative timing budget in the receiver. At faster frequencies it becomes necessary to improve on rise- and fall-time variations and SSO noise effects. What has now become a disadvantage in prior designs is the fact that the VDDH power supply was used to power the receiver. This makes the receiver susceptible to across-supply corner cases that degrade performance to an unacceptable level. Level-shifting from the VDDH supply to the core supply produces additional jitter, and in some corner cases the level-shifting part of the circuitry may not function at all since the core voltage is now approaching levels where high-voltage Field Effect Transistor (FETs) threshold voltages are too high to operate properly.

Accordingly, a need exists for an improved singled-ended receiver.

SUMMARY OF THE INVENTION

A first single-ended receiver consistent with the present invention includes a first stage for receiving an input signal and outputting a pair of corresponding output signals, and a second stage, electrically coupled to the first stage, for receiving the pair of output signals and outputting a corresponding single output signal. A bias circuit, electrically coupled to the first stage and the second stage, electrically biases the first and second stages, and a power supply is electrically coupled to the first stage, the second stage, and the bias circuit.

A second single-ended receiver consistent with the present invention includes a first stage for receiving an input signal and outputting a pair of corresponding output signals, and a second stage, electrically coupled to the first stage, for receiving the pair of output signals and outputting a corresponding single output signal. First and second pull-down transistors are coupled to first and second inputs to the first stage. A bias circuit, electrically coupled to the first stage and the second stages, and the first and second pull-down transistors, electrically biases the first and second stages, and the first and second pull-down transistors. A power supply is electrically coupled to the first stage, the second stage, and the bias circuit.

A method consistent with the present invention provides for a single-ended receiver and includes steps of receiving an input signal at a first stage and outputting a pair of corresponding output signals, and receiving the pair of output signals at a second stage and outputting a corresponding single output signal. The method also includes biasing the first stage and the second stage, and providing power to the first stage, the second stage, and the bias circuit.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Single-Ended Receiver Circuit

Figure 1:
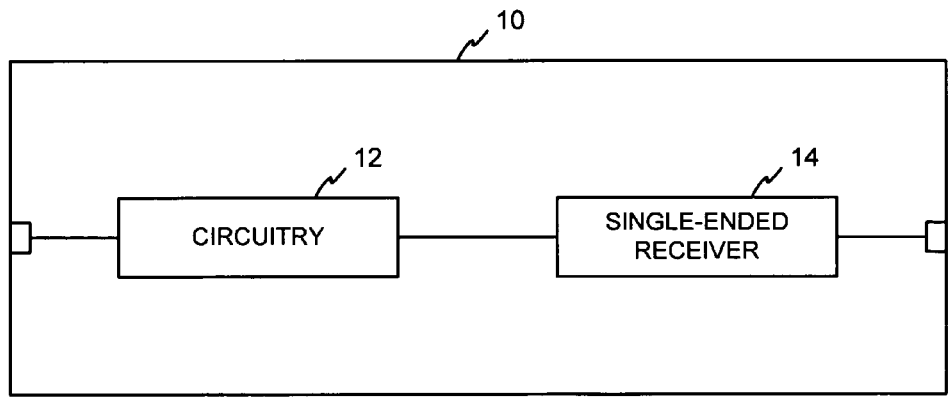
FIG. 1 is a block diagram illustrating an integrated circuit (IC) having a single-ended receiver.

FIG. 1 is a block diagram illustrating an integrated circuit (IC) 10 having a single-ended receiver 14. IC 10 typically includes additional circuitry 12, electrically connected with receiver 14, and circuitry 12 can include any type of circuit that requires or makes use of a single-ended receiver. A single-ended receiver compares an input voltage to a reference voltage and determines whether the input voltage is higher or lower than the reference voltage. The receiver then generates the appropriate output current or voltage for the intended application.

Figure 2:
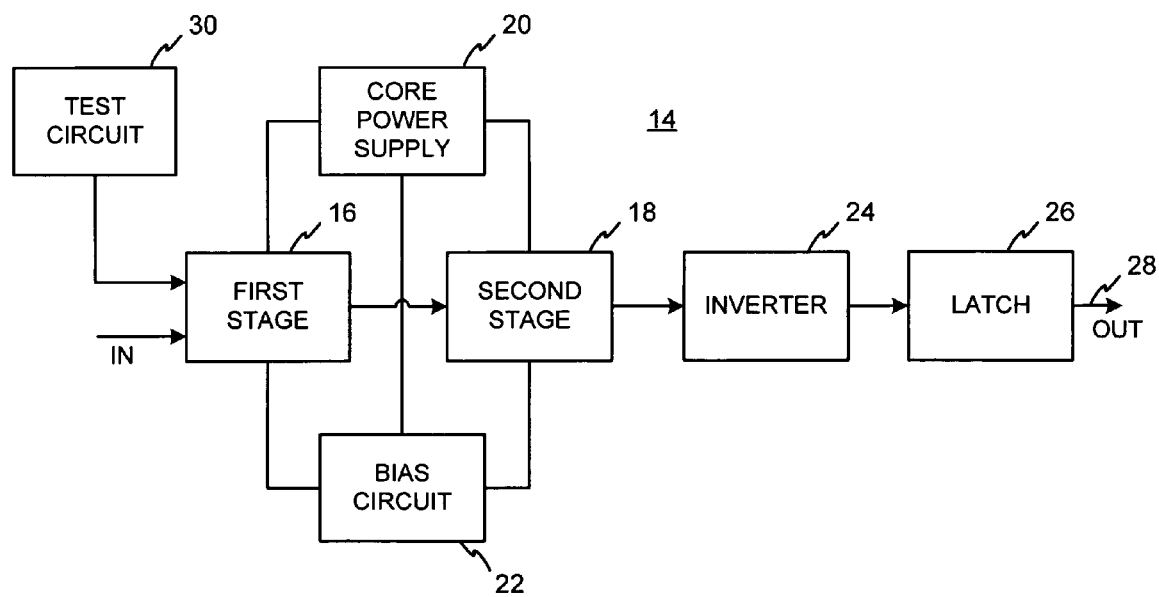
FIG. 2 is a block diagram of a single-ended receiver.

FIG. 2 is a block diagram of a single-ended receiver 14 consistent with the present invention. In one particular embodiment, receiver 14 includes a first stage 16 receiving an input signal (IN), a second 18 receiving an output of the first stage 16, a bias circuit 22 for biasing the first and second stages 16 and 18, and core power supply 20 providing power to the bias circuit 22 and the first and second stages 16 and 18. Receiver 14 can also include an inverter 24 receiving an output of second stage 18 and a latch 26 receiving an output of inverter 24. Latch 26 provides an output digital signal on line 28. Inverters and latches are known in the art, and inverter 24 and latch 26 can each be implemented with any circuit components that perform the functions of, respectively, an inverter and a latch. A test circuit 30 can be used with receiver 14 in order to test its operation. Test circuit 30 can be implemented with any circuit components capable of testing the operation of receiver 14.

Figure 3:
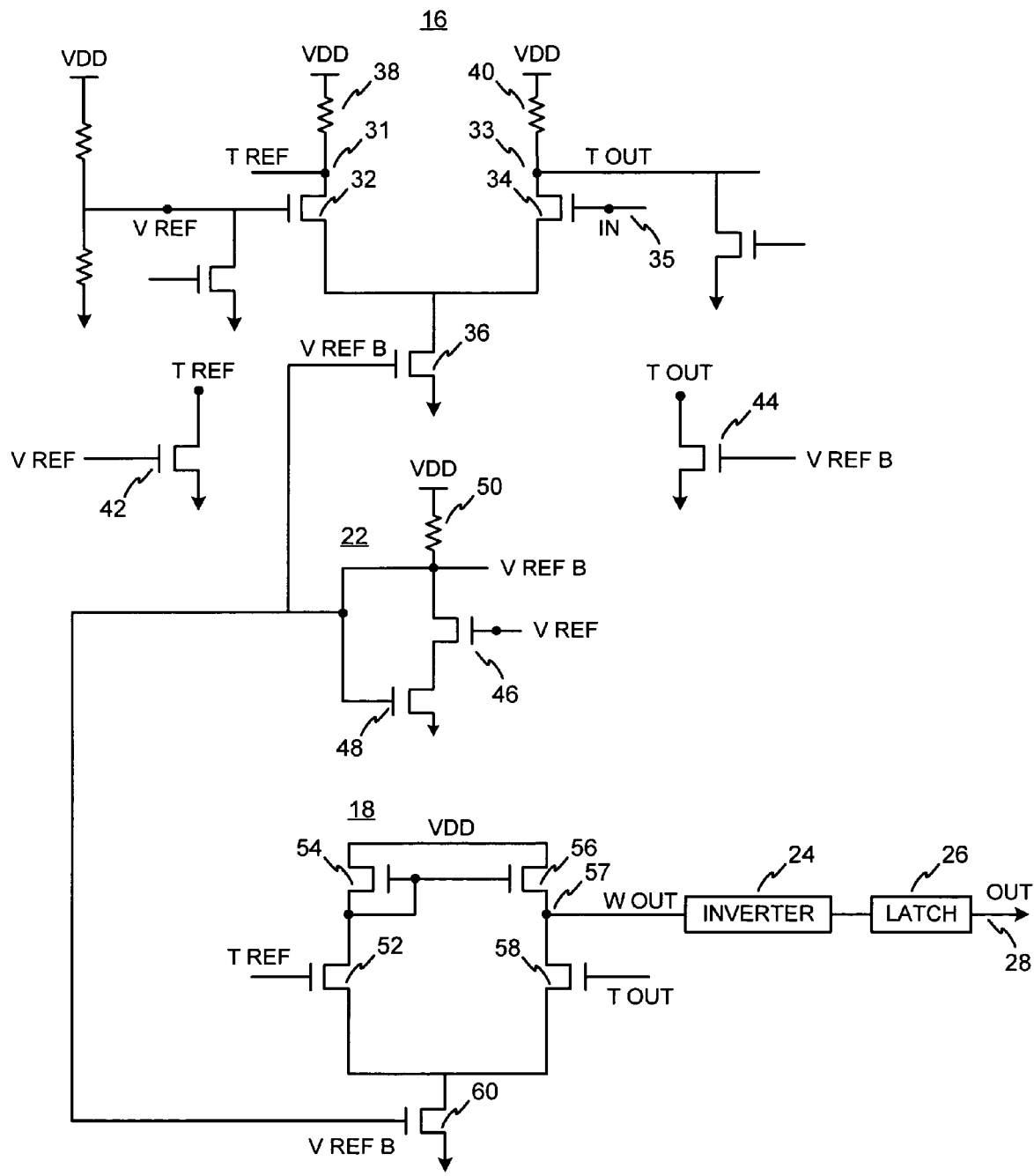
FIG. 3 is a circuit diagram of the single-ended receiver.

FIG. 3 is a circuit diagram of single-ended receiver 14. In this embodiment, first stage 16 includes a pair of transistors 32 and 34 connected in parallel. Transistor 32 receives a tREF signal at node 31 and can include a resistor 38 connected in series to the core power supply (VDD). Transistor 34 receives the input signal (IN) at node 35 and provides a tOUT signal at node 33, and transistor 34 can include a resistor 40 connected in series to the core power supply. Transistors 32 and 34 are connected at their source terminals to a transistor 36. Bias circuit 22 provides a VREFB signal to the gate terminal of transistor 36 for biasing first stage 16. First stage 16 also includes pull-down transistors 42 and 44 having their drain terminals connected to the terminals in first stage 16 for the tREF and tOUT signals, respectively.

Bias circuit 22, in this embodiment, includes a transistor 46, receiving a VREF signal at its gate terminal, connected in series with a transistor 48. Bias circuit 22 can also include a resistor 50 connected in series with transistors 46 and 48 between the core power supply and ground. Bias circuit 22 provides the VREFB signal for biasing the first and second stages 16 and 18.

Second stage 18, in this embodiment, includes a pair of transistors 52 and 54 connected in series, and another pair of transistors 56 and 58 connected in series. The first pair of transistors (52, 54) are connected in parallel with the second pair of transistors (56, 58). Transistors 54 and 56 have a common gate terminal connected to the drain terminal of transistor 52. Transistor 58 receives the tOUT signal at its gate terminal from node 33 in first stage 16, and second stage 18 provides a wOUT signal at node 57. Transistors 52 and 58 are connected at their source terminals to a transistor 60. Bias circuit 22 provides the VREFB signal to the gate terminal of transistor 60 for biasing second stage 18.

Inverter 24 receives the wOUT signal from second stage 18 and provides an inverted signal to latch 26, which provides the latched digital output signal (OUT) on line 28.

In this exemplary embodiment, as shown in FIG. 3, the transistors are implemented with FETs. However, other types of transistors, or other circuit components that perform the function of a transistor, can be used.

Single-Ended Receiver Operation

The design of receiver 14 operates as a receiver/level shifter in one solution. Complex Process/Voltage/Temperature (PVT) correction circuitry is avoided in this embodiment since the bias circuitry 22 mimics the receiver circuitry's PVT conditions and optimizes performance by setting the proper common-mode bias for each specific high-voltage/low-voltage FET PVT variation. The high voltage power supply is only used to generate the bias circuitry reference voltage, it is not used to supply the bias circuit 22 or first-stage receiver circuit 16, avoiding any Simultaneous Switching Noise (SSN) issues related to noise on the "dirty" (high-voltage) supply. The core voltage power supply 20 is used in the receiver bias circuitry 22, eliminating additional overhead due to level shifting to the appropriate power supply in the core, in turn reducing latency and jitter associated with traditional level shifters. Using the VDD power supply also eliminates the need to use high-voltage FETs for the entire receiver design, allowing low-voltage FETs to be used without encountering reliability issues.

The bias circuit 22 assures that the common-mode voltage stays in the same vicinity between the VDD and ground (GND) rails, allowing the second stage 18 to receive a clear differential signal with minimal common-mode variation. This means that the FET acting as a current source in the first stage 16 is not guaranteed to be in saturation in some cases. In an embodiment of the present invention, the gain of the first stage 16 is being sacrificed in order to generate a differential signal with a very narrow common-mode variation. This situation is tolerable since the gain of the second stage 18 can adequately amplify a differential signal allowing the third stage (inverter 24 and latch 26) to assure the signal is now translated to CMOS logic levels.

The bias circuitry 22 has feedback design around the VREF signal that allows the node VREFB to stabilize itself at whatever PVT value it needs to in order to keep the bias FET (50) from being biased too low or too high. This feedback loop keeps the bias voltage at the ideal common-mode range for the FET sizes chosen in the receiver 14. This same voltage (VREFB) is fed into a typical differential pair receiver design. The only high-voltage FETs in the receiver 14, in one embodiment, are the bias stabilizer FET (50) and the two FETs comprising the differential pair (32, 34). All other FETs in this embodiment are low-voltage FETs, greatly improving speed and performance for the receiver 14. This arrangement of low-voltage and high-voltage FETs can be used because the core voltage, VDD, is used to operate the FETs. In this case the core voltage is 1.2V and the high-voltage supplies can be either 1.5, 1.8, or 2.5V.

Receiver 14 described above, or other receivers consistent with the present invention, can provide for improvements over other receiver circuits including, for example, the following advantages: the receivers are capable of operating at 250 MHz DDR; the PVT changes that may impact receiver performance are greatly reduced because the receiver design operates at the optimum bias for its PVT conditions; affects of SSN are greatly reduced, since the receiver and bias circuitry work at the core voltage; the receivers provides for wider range of operation with a single design, since the biasing circuitry compensates for shits in the reference voltage; the receivers includes a minimal number of gain stages, which in turn reduces latency and PVT variation; this leads to improved timing; and the receiver designs effectively allows single-ended receivers to be used in high speed applications that may have required differential receivers in the past.

While the present invention has been described in connection with an exemplary embodiment, it will be understood that many modifications will be readily apparent to those skilled in the art, and this application is intended to cover any adaptations or variations thereof. For example, different components for the various circuit elements may be used without departing from the scope of the invention. This invention should be limited only by the claims and equivalents thereof.

The invention claimed is:

1. A single-ended receiver, comprising:
   a first stage for receiving an input signal and outputting a pair of corresponding output signals;
   a second stage, electrically coupled to the first stage, for receiving the pair of output signals and outputting a corresponding single output signal;
   a bias circuit, electrically coupled to the first stage and the second stage, for electrically biasing the first stage and the second stage; and
   a power supply electrically coupled to the first stage, the second stage, and the bias circuit.

2. The receiver of claim 1 wherein the first stage includes a pair of transistors coupled in parallel between the power supply and the bias circuit.

3. The receiver of claim 1 wherein the second stage includes first and second pairs of transistors coupled in parallel between the power supply and the bias circuit.

4. The receiver of claim 1, further including a first pull-down transistor coupled to a first input to the first stage and a second pull-down transistor coupled to a second input to the first stage.

5. The receiver of claim 1, further including an inverter electrically coupled to an output of the second stage for receiving the single output signal.

6. The receiver of claim 5, further including a latch coupled to the inverter and outputting a digital signal corresponding to the single output signal.

7. The receiver of claim 1 wherein the bias circuit includes first and second transistors coupled in series between the power supply and a ground connection.

8. The receiver of claim 7 wherein the bias circuit further includes a resistor coupled in series between the power supply and the first transistor.

9. The receiver of claim 7 wherein the first transistor comprises a high-voltage field effect transistor and the second transistor comprises a low-voltage field effect transistor.

10. A method for providing a single-ended receiver, comprising:
    receiving an input signal at a first stage and outputting a pair of corresponding output signals;
    receiving the pair of output signals at a second stage and outputting a corresponding single output signal;
    biasing the first stage and the second stage; and
    providing power to the first stage, the second stage, and the bias circuit.

11. The method of claim 10 wherein the receiving the input signal step includes receiving the input signal at a pair of transistors coupled in parallel between the power supply and the bias circuit.

12. The method of claim 10 wherein the receiving the pair of output signals step includes receiving the pair of output signals at first and second pairs of transistors coupled in parallel between the power supply and the bias circuit.

13. The method of claim 10, further including providing a first pull-down transistor coupled to a first input to the first stage and providing a second pull-down transistor coupled to a second input to the first stage.

14. The method of claim 10, further including inverting the single output signal from the second stage.

15. The method of claim 14, further comprising latching a signal, subsequent to the inverting step, for outputting a digital signal corresponding to the single output signal.

16. The method of claim 10 wherein the biasing step includes providing first and second transistors coupled in series between the power supply and a ground connection.

17. The method of claim 16 wherein the biasing step further comprises providing a resistor coupled in series between the power supply and the first transistor.

18. The method of claim 16 wherein the biasing step includes using a high-voltage field effect transistor for the first transistor and using a low-voltage field effect transistor for the second transistor.

19. A single-ended receiver, comprising:

a first stage for receiving an input signal and outputting a pair of corresponding output signals;

a second stage, electrically coupled to the first stage, for receiving the pair of output signals and outputting a corresponding single output signal;

first and second pull-down transistors coupled to first and second inputs to the first stage;

a bias circuit, electrically coupled to the first stage, the second stage, and the first and second pull-down transistors, for electrically biasing the first stage, the second stage, and the first and second pull-down transistors; and a power supply electrically coupled to the first stage, the second stage, and the bias circuit.

20. The receiver of claim 19 wherein the bias circuit includes a high-voltage transistor coupled in series with a low-voltage transistor.

* * * * *